US009738793B2

(12) United States Patent
Montesinos Gomez et al.

(10) Patent No.: US 9,738,793 B2
(45) Date of Patent: Aug. 22, 2017

(54) PROCEDURE SUMMARY OF WATER-BASED POLYMER RESIN DOPED TITANIUM DIOXIDE NANOTUBES AS APPLICATION CORROSION COATING

(71) Applicant: INSTITUTO MEXICANO DEL PETROLEO, Mexico City (MX)

(72) Inventors: Rosa del Carmen Montesinos Gomez, Mexico City (MX); Lizbeth Pliego Vences, Mexico City (MX); Nancy Romero Hernandez, Mexico City (MX); Cesar Andres Flores Sandoval, Mexico City (MX); Fernando Alvarez Ramirez, Mexico City (MX); Gerardo Ferrat Torres, Mexico City (MX); Jose Antonio Toledo Antonio, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 15/158,942

(22) Filed: May 19, 2016

(65) Prior Publication Data
US 2016/0272819 A1 Sep. 22, 2016

Related U.S. Application Data

(62) Division of application No. 13/922,909, filed on Jun. 20, 2013, now Pat. No. 9,371,588.

(30) Foreign Application Priority Data

Jun. 21, 2012 (MX) .................... MX/a/2012/007272

(51) Int. Cl.
| | | |
|---|---|---|
| C08L 83/00 | (2006.01) | |
| C09D 5/08 | (2006.01) | |
| C23F 11/173 | (2006.01) | |
| C09D 7/12 | (2006.01) | |
| C09D 133/08 | (2006.01) | |
| C09D 133/12 | (2006.01) | |
| C08K 9/08 | (2006.01) | |
| C08K 3/22 | (2006.01) | |

(52) U.S. Cl.
CPC ........... C09D 5/084 (2013.01); C09D 7/1291 (2013.01); C09D 133/08 (2013.01); C09D 133/12 (2013.01); C23F 11/173 (2013.01); C08K 3/22 (2013.01); C08K 9/08 (2013.01); C08K 2003/2237 (2013.01); C08K 2003/2241 (2013.01)

(58) Field of Classification Search
CPC ........ C08K 9/08; C09D 5/084; C09D 7/1291; C23F 11/173
See application file for complete search history.

(56) References Cited

U.S. PATENT DOCUMENTS

| | | | |
|---|---|---|---|
| 3,607,354 A | 9/1971 | Krogh et al. | |
| 4,594,262 A | 6/1986 | Kreil et al. | |
| 4,891,394 A | 1/1990 | Savin | |
| 5,298,059 A | 3/1994 | Takimoto et al. | |
| 5,674,934 A | 10/1997 | Schmidt et al. | |
| 5,766,687 A | 6/1998 | Rappoport | |
| 5,973,029 A | 10/1999 | Hsu et al. | |
| 6,383,271 B1 | 5/2002 | Schmidt | |
| 7,645,439 B2 * | 1/2010 | Toledo Antonio ..... | C01G 23/04 423/609 |
| 9,371,588 B2 * | 6/2016 | Montesinos .......... | C23F 11/173 |
| 2004/0019143 A1 | 1/2004 | Koloski et al. | |
| 2004/0087713 A1 | 5/2004 | Fujii et al. | |

(Continued)

FOREIGN PATENT DOCUMENTS

| | | |
|---|---|---|
| EP | 1316603 | 6/2003 |
| EP | 2228413 | 9/2010 |
| WO | 95/32228 | 11/1995 |
| WO | 98/52980 | 11/1998 |
| WO | 02/44286 | 6/2002 |
| WO | 2004/105963 | 12/2004 |
| WO | 2006/037949 | 4/2006 |

OTHER PUBLICATIONS

Kivit, P. et al., Water-Based Coatings Based on Mixtures of Acrylic Dispersions and Alkyd Emulsions, Macromol. Symp. 2009, 283-284, 290-299.

(Continued)

*Primary Examiner* — Hannah Pak
(74) *Attorney, Agent, or Firm* — Dickinson Wright PLLC

(57) ABSTRACT

The present invention relates to the application of polymeric resins and TiO2 doped with polymeric resins as coatings for external metal surfaces for industrial use, mainly by selecting the following metals: stainless steel, carbon steel and copper. Focuses specifically on the synthesis of a polymeric resin waterborne corrosion consisting of nano-structured polymer particles formed with two or more acrylic monomers, vinyl or styrenic a functionalizing agent and a cross-linking agent from 1.0 to 20% wt. each. Doping addition is made of the same polymeric resins, which are incorporated in nanotubes of titanium dioxide in concentrations ranging from 50 to 10,000 ppm. The polymeric resin is water based corrosion synthesized by emulsion polymerization techniques and is during the synthesis process is introduced nanotube loading of titanium dioxide (which are synthesized according to U.S. Pat. No. 7,645,439 B2), which allowing the dispersion in the polymer matrix. Polymer dispersions obtained in this way are used as anti-corrosion coatings 100% water based.

23 Claims, 6 Drawing Sheets

(56) References Cited

U.S. PATENT DOCUMENTS

| | | |
|---|---|---|
| 2005/0182169 A1 | 8/2005 | Stubbe et al. |
| 2006/0047062 A1 | 3/2006 | Hsu et al. |
| 2009/0017304 A1 | 1/2009 | Koller et al. |
| 2009/0175757 A1* | 7/2009 | Yao ................. C04B 41/009 422/4 |
| 2009/0182084 A1 | 7/2009 | Ding et al. |
| 2010/0160586 A1 | 6/2010 | Koglin et al. |

OTHER PUBLICATIONS

Suma, K. et al., Paint Formulation Using Water Based Binder and Property Studies, Macromol. Symp. 2009, 277, 144-151.

Ito, K. et al., Rapid viscosity determination of waterborne automotive paint emulsion system by FT-Raman spectroscopy, Vibrational Spectroscopy 35 (2004) 159-163.

Decocq, F. et al., A New Technology for Environmentally Friendly, UV-Resistant, Water-Borne Anticorrosion Paints, Journal of protective coatings and linings 48 (2001).

Diaconu, G. et al., High-Solids Content Waterborne Polymer-Clay Nanocomposites, Macromol. Symp. 2007, 259, 305-317.

Zhu, A. et al., Film characterization of poly(styrene-butylacrylate-acrylic acid)—silica nanocomposite, Journal of Colloid and Interface Science 322 (2008) 51-58.

Yeh, J.M. et al., Preparation, characterization and electrochemical corrosion studies on environmentally friendly waterborne polyurethane/Na+-MMT clay nanocomposite coatings, European Polymer Journal 44 (2008) 3046-3056.

Al, Z. et al., Polyacrylate-Core/TiO2-Shell Nanocomposite Particles Prepared by In Situ Emulsion Polymerization, Journal of Applied Polymer Science, vol. 102, 1466-1470 (2006).

Montesinos-Gomez, R. et al., Latex Film Performance of Styrene—Acrylic Particles Functionalized with Acrylic Acid, Journal of Applied Polymer Science, vol. 113,553-557 (2009).

Reyes-Mercado, Y. et al., Effect of the acrylic acid content on the permeability and water uptake of poly(styrene-co-butyl acrylate) latex films, Colloid Polym Sci (2008) 286:603-609.

Pliego Vences, Lizbeth, Doctoral Thesis Titled "Sintesis de Recubrimientos Nanocompositos con Matriz Polimerica y Carga de Nanotubos Dioxido de Titanio", p. 102, Tecnologico de Estudios Superiores de Ecatepec, Published on Oct. 20, 2011, and English translation thereof.

\* cited by examiner

PROCEDURE SUMMARY OF WATER-BASED POLYMER RESIN DOPED TITANIUM DIOXIDE NANOTUBES AS APPLICATION CORROSION COATING

This application is a divisional application of U.S. application Ser. No. 13/922,909 filed Jun. 20, 2013, which is hereby incorporated by reference in its entirety.

TECHNICAL FIELD OF THE INVENTION

This invention relates to polymer dispersions in the field of anti-corrosion coatings for metal structures external industrial use. Focuses specifically on the synthesis of polymeric resin 100% water based corrosion, to which may or may not incorporate titanium dioxide nanotubes.

BACKGROUND OF THE INVENTION

Anticorrosive polymeric coatings are known since the early 50's, as shown in U.S. Pat. No. 5,674,934, where they were used with organic solvents, so that at present they are undesirable because of the toxicity and flammability of these solvents.

Applications for patent publication No. WO 95/32228, U.S. 2004/0087713 and No. WO 2004/105963 show that the industry has worked in research and development of new coatings with low VOC's composition (Volatile Organic Compounds) that are in high demand from the ecological point of view as mentioned Kivit P. et al. 283-284:290 *Macromolecular Symposium* (2009). Suma et al. *Macromolecular Symposium* 277:144 et al. (2009) used a synthetic procedure for preparing emulsion coatings focusing on properties such as pH, solids content, glass transition temperature and chemical composition. The industry has increased interest in a coating with good corrosion protection and mechanical strength as have been studied by Ito et al. *Vibrational Spectroscopy* 35:159 (2004) and U.S. Patent Application 2009/0182084 A1 and EP 1316603 A1. However, it is often difficult to achieve smooth coating finishes and high quality, such as those required in the industry, eliminating the use of organic solvents to help lower the viscosity and contributes to the leveling of a coating.

Decocq, F. et al *Journal of protective coatings and linings* 48 (2001) studied new technologies for coatings which are generally used to create a protective barrier on floors, cars, exterior and interior of houses, industries, piping, equipment, among others.

One of the most important goals of the coatings industry is the minimization of the use of organic solvents in the formulation of aqueous coating compositions that provide a smooth high gloss and good physical properties.

The compositions of coating aqueous base are also sensitive to the application conditions.

Synthetic water-based emulsions, such as styrene resin emulsions, styrene-acrylic emulsions and acrylic gradually replaced solvent-based formulations such as disclosed in U.S. Pat. No. 5,674,934.

A critical property to consider is the adherence of the coating to the substrate, as described in international patent application WO 98/52980 for the coatings industry. The state of the art pre-treatment includes the surfaces as U.S. Pat. No. 3,607,354 (chemical treatment), U.S. Pat. No. 4,594,262 (electron beam irradiation).

For metal surfaces, for example, U.S. Pat. No. 5,766,687 discloses a mixture of liquid epoxy rubber, amines and sulfur compounds such as anti-corrosive coating. U.S. Pat. No. 5,298,059 proposes the anticorrosive coating composition, comprising melamine cyanurate, a thermosetting resin, a curing agent and a solvent. U.S. Pat. No. 6,383,271 describes a coating comprising a hollow cell structure and a compound in the hollow portion comprising corrosion inhibitors both organic and inorganic.

U.S. patent application U.S. 2006/0047062 includes a compound to increase the compatibility of metal pigments with organic compounds crosslinked.

In its U.S. patent application No. U.S. 2010/00160586, a company dedicated to the manufacture of coatings and paints proposes obtaining resins derived mostly from renewable or recyclable materials, which can be used in the formulation of coatings rent-reduced VOC acrylic.

In the last decade, a new line of research has attracted interest both from academia and industry, and is the design of new composite materials, which are made up of two or more different materials (polymer, metal and/or ceramic), which can increase or completely alter the properties of the individual compounds, making them more efficient and viable. U.S. Pat. No. 4,891,394 incorporates in its formulation an epoxy polymer and/or vinyl and a metallic pigment preferably zinc or aluminum and a conductivity control agent such as silica.

In U.S. Patent Application 2004/0019143 and WO 02/44286 and as shown Diaconu et al. *Macromolecular Symposium on* 259:305 (2007), has increased the study of composite materials and polymer-based nanocomposites water (with a polymer matrix and an inorganic filler) because of its environmental involvement, as shown in U.S. Patent Application U.S. 2005/0182169, which relates to a novel process for preparing nano-composites, nano-particles used as filler.

Zhu, A. et al. *Journal of Colloid and Interface Science* 322:51 (2008) characterized the film formation of a resin filled with silica nanocomposite, which increase the water resistance and mechanical properties. Also Yeh, J. M. et al. *European Polymer Journal* 44:3046 (2008) have shown satisfactory performance by increasing waterborne anticorrosive polymer doped with Na+MMT.

Ai Z. et al. *Journal of Applied Polymer Science* 102:1466 (2006) report the results of the preparation of polymeric core particles and metal shell, as in the U.S. patent application U.S. 2009/0017304, showing good properties as coatings of the synthesized particles. Metallic Nanoparticles like Ag, Au, Cu, Mg, were used as hydroxides, oxides, or metallic in European Patent No. EP 2,228,413 and carbon nanotubes in the international patent application with publication No. WO 2006/037 949.

All state of the art known by the applicant, refers to new products that are designed and used nano-composite materials to improve the physical and chemical properties of the coatings, as shown in U.S. patent application U.S. 2005/0182169 and U.S. Pat. No. 5,973,029.

The present invention overcomes all references clearly indicated above, under which the objective is the development of new polymeric resin particles consisting of polymer dispersions in water, prepared by free radical polymerization which are used as anti-corrosion coatings 100% waterborne and synthesizing a composite polymeric particles dispersed in water and nanotubes doped titanium dioxide (the latter were synthesized according to what is described in U.S. Pat. No. 7,645,439 B2). The incorporation of the nanotubes in the polymer matrix above contributes substantially to improving the properties of coating.

BRIEF DESCRIPTION OF THE DRAWINGS OF THE INVENTION

In order to have a better understanding of the 100% water based corrosion doped titanium dioxide nanotubes polymeric resin and their synthesis obtained in the present invention, reference will now be made to the accompanying Figures:

FIG. 1 shows the arrangement of the semi-continuous reactor, which comprises 1) Main Reactor. 2) addition pump, 3) tank of pre-emulsion feed, 4) bath temperature control and 5) stream of inert gas.

FIG. 2 shows two micrographs obtained by the technique of atomic force microscopy. FIG. 2(A) corresponds to Example 3 (commercial epoxy coating). FIG. 2(B) corresponds to Example 1 (the two monomers polymeric resin 100% water based).

FIG. 3 depicts a graphical representation of the interaction of the core-shell polymer particles with $TiO_2$ nanotubes. FIG. 3(a) shows the distribution of the core-shell particles around a $TiO_2$ nanotube. In this case the shell is formed an inter-diffused film covering the nanotube. FIG. 3(b) shows the regions corresponding to the particle core and the nanotube, in which case the inter-diffused shell has been removed for clarity. FIG. 3(c) shows the abstract model corresponding to the three regions shown in FIGS. 3(a) and 3(b).

FIG. 4 shows a graph with the thermogravimetric analysis of Example 1 (the polymer resin of two monomers) of Example 2 (polymer resin three 100% water based monomers) of Example 3 (commercial epoxy coating), Example 4 (the polymeric resin nanotubes doped titanium) and example 5 (a coating commercial epoxy crosslinking agent).

FIG. 5 presents the evaluation of the adhesion with respect to particle size of the water-based polymer coating metal and glass substrate (plate of AISI 1010 carbon steel), which is performed to test the efficiency of the coatings. FIG. 5A corresponds to the polymer resin of Example 1. FIG. 5B corresponds to the polymer resin of Example 2 (polymer resin three monomers).

FIG. 6 illustrates the graphical representation of the drying speed with respect to time, generally showing the formation of the film of Example 3 (commercial epoxy coating) of Example 4 (the polymeric resin nanotubes doped titanium) and example 5 (a coating commercial epoxy crosslinking agent).

FIG. 7 illustrates the graphical representation of the adhesion with respect to particle size in Example 1 (two monomers polymer resin based 100% water) and example 2 (the polymer resin of three monomers 100% water based).

FIG. 8 displays images of the adhesion evaluation of Example 1 (two monomers polymeric resin 100% water based).

DETAILED DESCRIPTION OF THE INVENTION

The present invention relates to polymer dispersions in the field of anti-corrosion coatings for metal structures external industrial use mainly by selecting the following metals: stainless steel, carbon steel and copper. Focuses specifically on the synthesis of polymeric resin 100% water based corrosion, to which may or may not incorporate titanium dioxide nanotubes.

The preparation of the coating of this invention is carried out by emulsion polymerization techniques, which methods are among the most used for obtaining coatings (U.S. Patent Application No. U.S. 2009/0017304). These polymerization techniques are especially disperse media used in obtaining polymer particles nano-structured core-shell type (International Patent Application Publication WO 2009/085593). Both the core and the shell can be synthesized from a single monomer (homopolymer) or combinations of two monomers (copolymers), three monomers (terpolymers) and four monomers (tetrapolymers).

Figure 1:
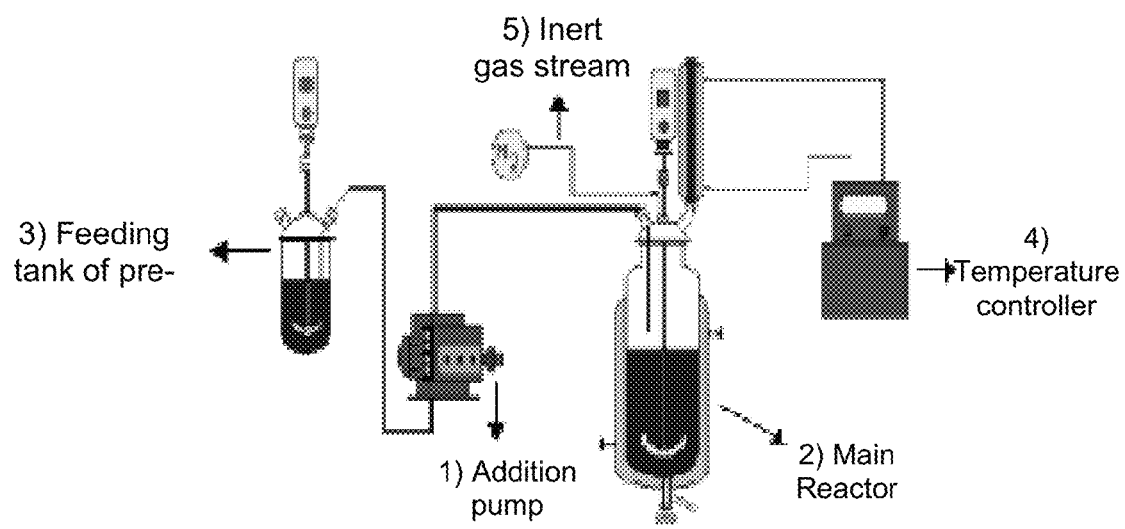

The emulsion polymerization is carried out in an aqueous medium, using a semi-continuous reactor [Reyes, Y. et al. Colloid Polymer Science 286:603 (2008)]. The emulsion polymerization process involves placing a small amount of the selected combination of monomers together with water, initiator and surfactant within the main reactor and reacted to form a seed. Subsequently, adding the pre-emulsion, consisting of the rest of the monomers emulsified in water by the action of surfactant and initiator dissolved in the aqueous phase, the main reactor at a constant rate with the help of the metering pump (FIG. 1). If you want to synthesize core-shell particles addition is carried out in two stages. During the first stage monomers are added and the crosslinking agent emulsified in water due to the presence of surfactant. After the first addition is introduced into the reactor at a controlled rate principal monomers and functionalizing agent (an agent adhesion promoter) that will form the shell. Both the core and the shell can be prepared from mixtures of two, three or four styrenic monomers, vinyl and/or acrylic. When addition of all the monomers has been completed, it proceeds to a curing step which removes any residual monomer remaining.

The reaction temperature for the synthesis is set in a range between 25 and 100° C., preferably between 35 and 95° C. and most preferably between 45 and 90° C. The emulsion polymerization process may optionally include the preliminary preparation of a seed to control the number of particles and thus the size and distribution of particles, which in the present invention has significant importance. One technique for adjusting the size of the polymer particles is by adjusting the initial loading concentration of surfactant and/or monomers. In the present invention the seed is formed from 0 to 10% by weight of the total monomers, preferably from 0.5 to 7% by weight of the total monomers and more preferably from 1 to 5% by weight of the total monomers.

In the emulsion polymerization initiator is added to start the reaction. Addition of the initiator into the pre-emulsion is made along the whole synthesis process. The initiator is used between 0.5 and 10% by weight relative to the total monomer content, preferably from 1 to 6% by weight relative to the content of the monomers and more preferably 2 to 4% by weight with respect to total monomer content. Examples of initiators which thermally decompose to generate free radicals, water-soluble or soluble in the monomer are selected from the following compounds, hydrogen peroxide, tert-butyl hydroperoxide, peroxide diterbutilo, hydroxyperoxide, ammonium persulfate, potassium persulfate, sodium perphosphate azobisisobutyronitrile and other similar compounds.

Emulsion syntheses normally contain surfactants to stabilize the growth of the polymer particles and to prevent the formation of aggregates of such particles, is added from 0.5 to 10% by weight with respect to the concentration of the monomers, preferably from 1.5 to 7% weight relative to the concentration of the monomers and more preferably from 2.5 to 5% by weight relative to the monomer concentration.

The surfactants are of the anionic, cationic or nonionic, including for example the sodium lauryl sulfate, the aryl sulfonates, benzyl isopropyl sodium sulfate, sodium octyl sulfosuccinate, alkylaryl polyglycol ether sulfate and many more.

The synthesis of the polymer resin may be homogeneous (addition of the monomers in a single stage) or structured (addition of the monomers in two stages), but not limited to a structure of core/shell. The size of the polymer particles is in the range of 30 to 600 nm, preferably 80 to 550 nm and more preferably from 110 to 500 nm and still more preferably from 125 to 450 nm [Montesinos-Gomez et al. Journal of Applied Polymer Science 113:553 (2009)]. The average particle size is measured by the light scattering technique quasi-elastic (QELS, for its acronym in English, using a Autosizer Malvern 4800 spectrometer with a laser Coherent Innova 90c). The particles are regularly spherical core in a ratio of 10 to 90% of the total weight of the particle and the shell in an amount covering 90 to 10% of the total weight of the particle.

Figure 2:
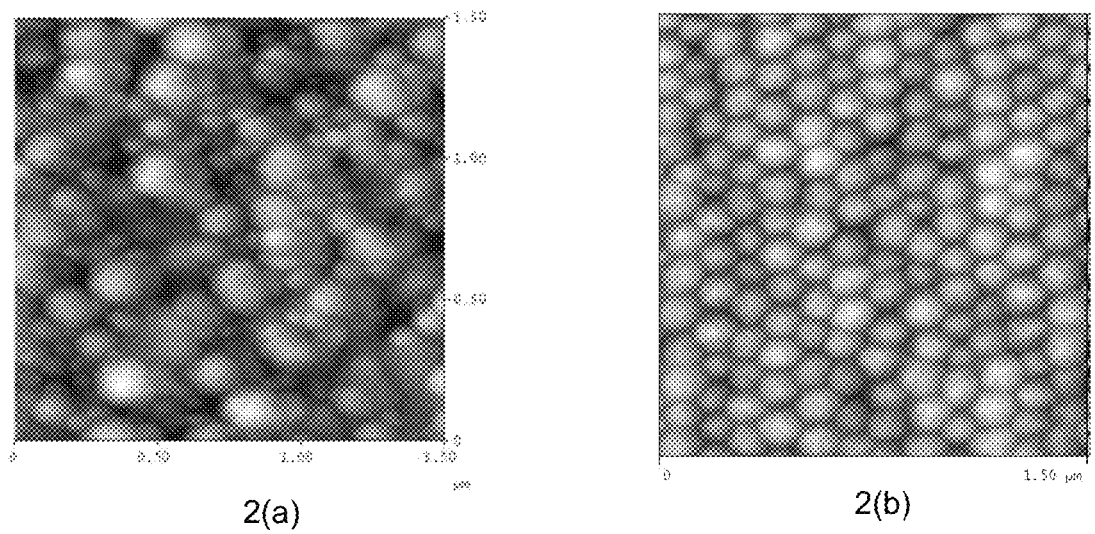

All polymeric resins synthesized with the method of the present invention is highly monodisperse particles, i.e. with very similar sizes for each of them. This can be seen in FIG. 2 in which are two micrographs obtained by the technique of atomic force microscopy. In FIG. 2A, corresponding to a water-based commercial coating without anticorrosion properties there is a wide variety of sizes and poor arrangement that prevents the formation of a homogeneous film which prevents the passage of water and salts to the metal substrate. However, in FIG. 2B differs compact film, formed from monodisperse particles prepared in accordance with our semicontinuous emulsion polymerization.

PH control is important because the stability of the reaction, which is adjusted using a buffer, the following compounds selected from ammonium bicarbonate, potassium bicarbonate, calcium carbonate, calcium bicarbonate, dihydrogen phosphate, which is added in the pre-emulsion and throughout the period of synthesis. Latexes having pH values around 6.5 to 9.0, preferably from 7.0 to 8.5.

The glass transition temperature in accordance with the present invention is in a range between 20 and 100° C., preferably between 5 and 80° C., and more preferably between 10 and 60° C. The decomposition temperature of the coating should be in the range of 40 to 500° C., preferably between 100 and 400° C. and more preferably between 200 and 350° C.

Coatings are typically prepared from the polymerization of one or more ethylenic monomers such as styrene monomers, and vinyl acrylics.

In the present invention has at least one monomer from the group of acrylics, selected from the following compounds: methyl acrylate, ethyl acrylate, methyl methacrylate, ethyl methacrylate, isopropyl acrylate, butyl acrylate, butyl methacrylate methacrylate, 2-ethylhexyl acrylate, neopentyl methacrylate, neopentyl acrylate, decyl acrylate, lathyl methacrylate, benzyl acrylate, phenyl ester, butyl ester, and pentyl ester. Among the styrenic monomers used in the synthesis of these polymeric resins are styrene, vinyl toluene and alpha methyl styrene. As vinyl monomer employed in this invention are considered vinyl acetate. Preferably, to prepare the polymeric resins from copolymers, terpolymers or tetrapolymers, monomers are used and provided with acrylic groups containing from 1 to 8 carbon atoms in their structure. Acrylic monomers are combined with at least one styrenic monomer and/or a vinyl monomer, being added in a proportion between 0 and 80% of the total weight of the monomer, preferably between 15 and 70% by weight of total monomers and more preferably between 30 and 60% by weight of total monomers. Likewise, styrene monomer, when combined with at least one acrylic monomer and/or a vinyl monomer being polymerized in a proportion between 0 and 70% by weight of total monomers, preferably between 10 and 60% in weight of the total monomers and more preferably between 20 and 50% by weight of total monomers. In the case of the vinyl monomer is reacted with at least an acrylic monomer and/or styrenic monomer, including a proportion between 0 and 50% of the total weight of the monomers, preferably between 10 and 40% in weight of the total monomers and more preferably between 20 and 30% of the total weight of the monomers in the pre-emulsion.

Additionally, it is used an adhesion promoting agent (functionalizing agent), such as a carboxylic acid monomer selected from the following compounds: acrylic acid, methacrylic acid, acrylic acid ethane, metaetanoacrilico acid, chloroacrylic acid, cyanoacrylic acid, propionic acid or itaconic acid. This is added in the initial or final stage of the synthesis in a proportion between 0 and 20% by weight of total monomers, preferably 1 to 15% by weight of total monomers and more preferably from 2 to 10% of the total weight of the monomers, because although these compounds can increase the adhesion properties of the coatings also increases the degree of hydrophilicity of the same, which can lead to occlusion of small quantities of water and thus reduce the ability corrosion protection coating [Montesinos-Gomez et al. Journal of Applied Polymer Science 113:553 (2009)].

A crosslinking agent may or may not be used in the synthesis process with a concentration of 0 to 15% by weight, preferably from 0.5 to 10% by weight and more preferably from 1 to 5 wt %. Selected cross-linking agents are divinylbenzene, ethylene glycol dimethyl acrylate, trimethyl propane trimethacrylate, trimethylolpropane hilolpropano and pentaerythritol tetraacrylate.

The total synthesis time is 1 to 10 h, preferably 2 to 8 hours and more preferably 4 to 6 h.

After the synthesis is obtained a polymeric resin which is a dispersion of two, three or four polymerized monomers throughout the reaction, which are respectively called copolymers, terpolymers and tetrapolymers. The final content of the copolymer, terpolymer or tetrapolymer functionalized and/or crosslinked polymeric resin comprises ranges from 10 to 60 wt %, more preferably 20 to 50 wt % and even more preferably 30 to 45 wt %. The remaining content of the polymer resin corresponding to the water.

Also incorporated into the polymer resin TiO2 nanotubes (which are synthesized according to U.S. Pat. No. 7,645,439), using concentrations ranging from 50 to 10,000 ppm of these being preferred to use between 100 and 5,000 ppm, and most preferably between 500 and 2,500 ppm of these nanotubes. The nanotubes are added to the reaction system from the reactor tank semi addition (see FIG. 1). To be highly hydrophobic nanotubes can not be dispersed directly in water-based polymeric resin, so that in the present invention are mixed with the monomers to be polymerized. In the case of the synthesis of core-shell particles, the dispersion can be effected in the first or second step of adding the pre-emulsion into the main reactor.

Example 1. Synthesis of a Polymer Resin Consisting of Two Monomers (Copolymer)

A 1 L reactor consisting of a stirrer, cooling equipment feedline inert gas (N2), the feed tank pre-emulsion, bath temperature control and metering pump. Were added from 160 to 220 g of MMA (methyl methacrylate), of 20 to 80 g Abu (butyl acrylate), 2.0 to 3.0 g of surfactant, of between 3.5 and 5.5 g of NaHCO3 and between 8.0 and 9.0 g of APS (ammonium persulfate). The reactor was heated in a temperature range between 70 and 85° C. and into it was added reagents for the pre-emulsion, of between 0.5 and 2.0 g of the monomer mixture, between 1.0 and 3.0 g of lauryl sulfate sodium, 80 to 110 g of NaHCO3, between 15 and 20 g of APS and the remaining water to obtain a solid theoretical rate of about 40%.

The reaction is initiated by an interval of 15 to 45 min, with stirring from 250 to 400 RPM. The rest of the monomers are arranged in a continuously stirred tank addition. Starts the addition of the first tank with the help of the metering pump over a period of 2.0 to 4.0 h, at the end of the tank is left to react for 20 to 60 min.

Example 2. Synthesis of a Polymer Resin Consisting of Three Monomers (Terpolymer)

A 1 L reactor consisting with stirrer, cooling equipment feedline inert gas (N2), the feed tank pre-emulsion, bath temperature control and metering pump. Are added between 35 and 65 g of MMA (methyl methacrylate) of 110 to 120 g Abu (butyl acrylate) of 50 to 80 g of S (styrene), 2.0 to 3.0 g surfactants, of between 3.5 and 5.5 g of NaHCO3 and between 8.0 and 9.0 g of APS (ammonium persulfate). The reactor was heated in a temperature range between 70 and 85° C. and into it was added reagents for the pre-emulsion, of between 0.5 and 2.0 g of the monomer mixture, of between 1.0 and 3.0 g of lauryl sulfate sodium, 80 to 110 g of NaHCO3, between 15 and 20 g of APS and the remaining water to obtain a solid theoretical rate of about 40%.

The reaction is initiated by an interval of 15 to 45 min, with stirring from 250 to 400 RPM. The remaining components are disposed in a tank of addition with continuous stirring. Starts the addition of the first tank with the help of the metering pump over a period of 2.0 to 4.0 h, to complete addition of the tank is left to react for 10 to 40 min.

Example 3. Synthesis of a Polymer Resin Core-Shell Type

A 1 L reactor consisting with stirrer, cooling equipment feedline inert gas (N2), the feed tank pre-emulsion, bath temperature control and metering pump. 40 are added to 50 g of MMA (methyl methacrylate) of 110 to 120 g Abu (butyl acrylate), 60 to 70 g of S (styrene) of between 2.4 and 4.8 g of EGDMA (acrylate glycol di-methylethyl) of between 7.2 to 9.6 g of AA (acrylic acid), 2.0 to 3.0 g of surfactant, of between 3.5 and 5.5 g of NaHCO3 and between 8.0 and 9.0 g of APS (ammonium persulfate). The reactor is heated in a temperature range between 70 and 85° C. and the reagents are added to the seed formation, between 0.5 and 2.0 g of the monomer mixture, of between 1.0 and 3.0 g of Disponil® AES13, between 80 and 110 g of NaHCO3, between 15 and 20 g of APS and the remaining water to obtain a solid theoretical rate about 40%.

The reaction is initiated by an interval of 15 to 45 min, with stirring from 250 to 400 RPM. The rest of the monomers is divided into two continuous stirred tanks addition, the first with the weight content of the core and the total EGDMA and second with the weight content of the shell and the total AA. Starts the addition of the first tank to the metering pump over a period of 2.0 to 4.0 h, at the end of the addition of the pre-emulsion tank one is allowed to react under the same conditions for 10 to 20 min, and starts the addition of the pre-emulsion tank for a period of two 1.0 to 2.0 h to complete the reaction is cured for a period of between 30 and 60 min.

Example 4. Synthesis of a Polymer Resin Core-Shell Type Doped TiO2 Nanotubes

A 1 L reactor consisting with stirrer, cooling equipment feedline inert gas (N2), the feed tank pre-emulsion, bath temperature control and metering pump. Are added to 40 to 50 of MMA (methyl methacrylate) of 110 to 120 g Abu (butyl acrylate), 60 to 70 g of S (styrene) of between 2.4 and 4.8 g of EGDMA (acrylate glycol di-methylethyl) of between 7.2 to 9.6 g of AA (acrylic acid), 2.0 to 3.0 g of surfactant, of between 3.5 and 5.5 g of NaHCO3 and between 8.0 and 9.0 g of APS (ammonium persulfate). The reactor is heated in a temperature range between 70 and 85° C., in which the reagents are added to the seed formation, between 0.5 and 2.0 g of the monomer mixture, of between 1.0 and 3.0 g of AES13 Disponil®, of 80 to 110 g of NaHCO3, between 15 and 20 g of APS and the remaining water to obtain a solid theoretical rate about 40%.

Figure 3:
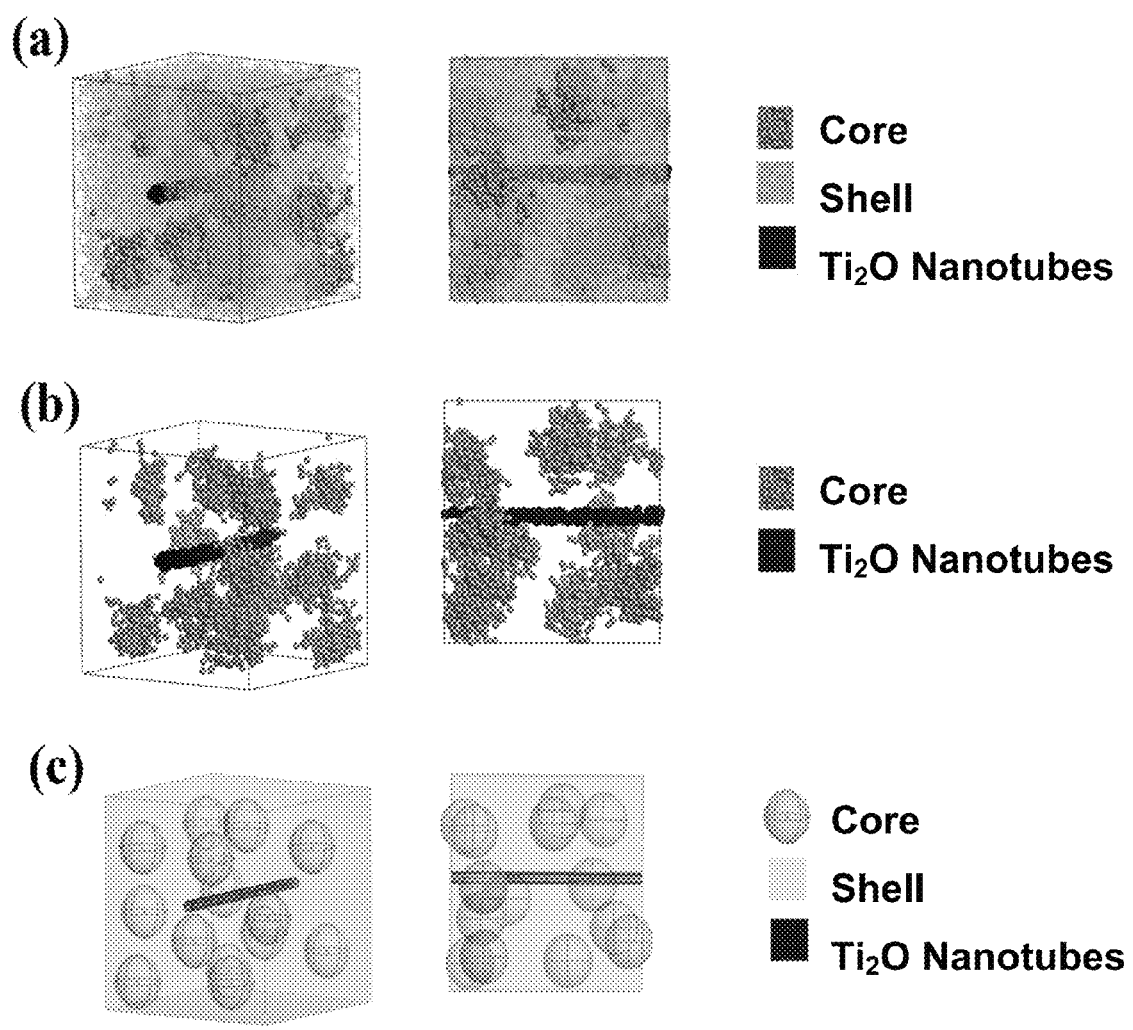

The reaction is initiated by an interval of 15 to 45 min with stirring from 250 to 400 RPM. The rest of the monomers is divided into two continuous stirred tanks addition, the first with the weight content of the core and the total EGDMA and second with the weight content of the shell and the total AA. Starts the addition of the first tank with the help of the metering pump and the reactor is added TiO2 nanotubes over a period of 2.0 to 4.0 h, at the end of the tank is left to react for 10 to 20 min and starts the addition of the second tank for a period of 1.0 to 2.0 and at the end of the reaction is cured for a period of between 30 and 60 min. FIG. 3 shows a graphical representation of the interaction between the polymer particles and the nanotubes of titanium dioxide. FIG. 3(a) shows the distribution of the core-shell particles around a TiO2 nanotube. In this case the shell is formed an inter-diffused film covering the nanotube. FIG. 3(b) shows the regions corresponding to the particle core and the nanotube, in which case the inter-diffused shell has been removed for clarity. FIG. 3(c) shows the abstract model corresponding to the three regions shown in FIGS. 3(a) and 3(b).

Example 5. Preparation of Catalyzed Epoxy Enamel

Additionally for comparison and took a commercial epoxy coating consisting of a glaze and catalyzed epoxy crosslinking agent or catalyst with a rate of about 50% solids by weight VOC Mix about 490 g/L, which was subjected to the same characterizations and evaluation tests that the polymeric resins synthesized in Examples 3 and 4.

Figure 4:
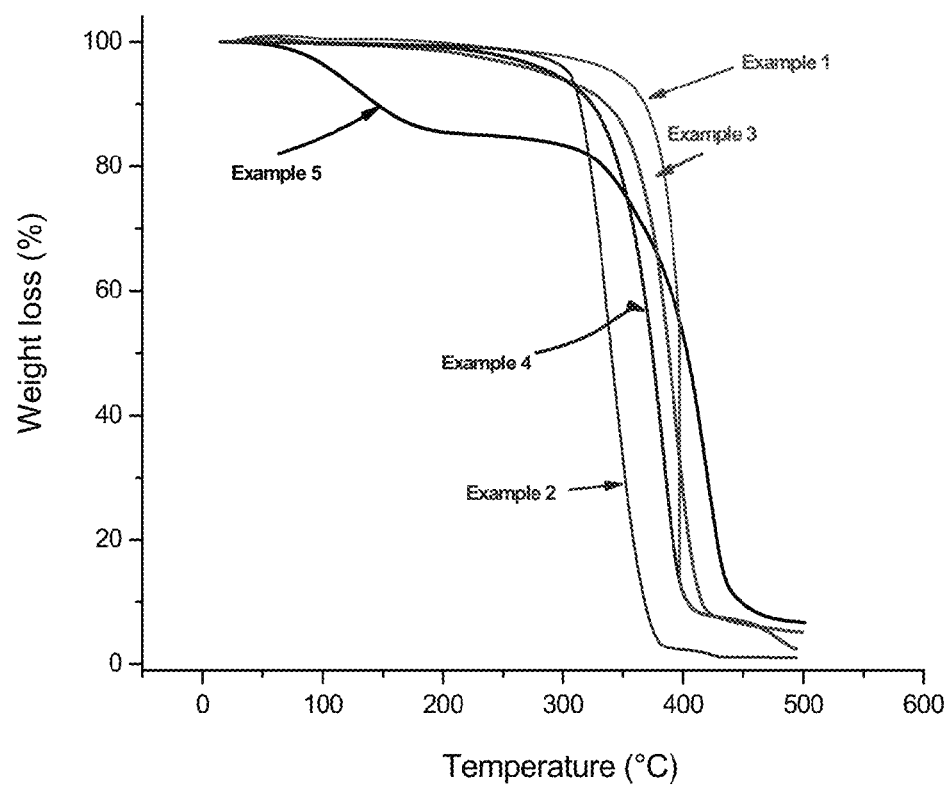

Example 6. Characterization of the Decomposition Temperature 10 mL are taken of the products obtained in Example 1 to 5, which is oven-dried to remove completely the water contained. The polymers obtained thermogravimetric analysis was performed on a FT-IR spectrophotometer TGA Bruker IFS 66v/s®. In FIG. 4 the results of thermogravimetric analysis shows a mass loss with time, the example 1 for its mixture of monomers at a stage three shows the thermal stability lower, around 375° C. for the application of a industrial coating is within the required specifications.

Examples 2, 3 and 4 have the same behavior, showing the mass loss or decomposition temperature in a range of 400-430° C. However, Example 3 relates to an epoxy coating with a crosslinking agent or catalyst, both commercial, which has two mass loss or decomposition temperatures, the first at 105° C. may be due to crosslinking and the second decomposition temperature to 327° C.

Example 7. Evaluation of Drying Quickly

Figure 5:
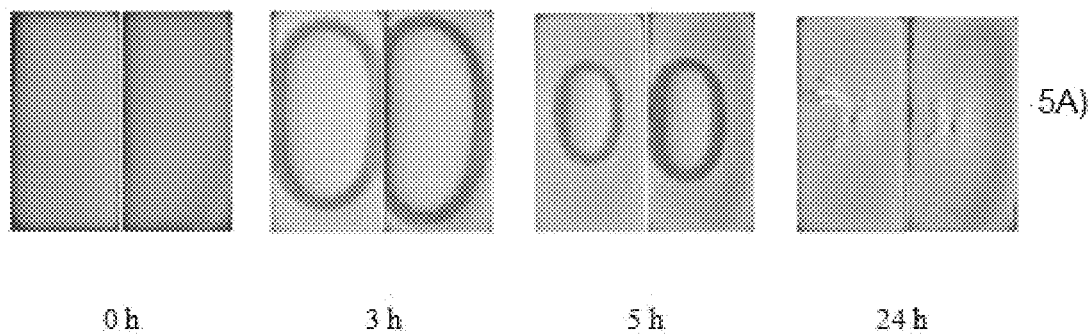
Figure 5:
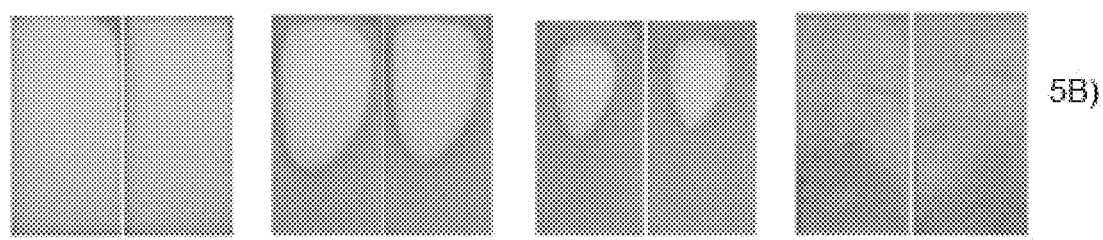

For perspective of the drying process of a polymer film was prepared two samples with polymer resins synthesized in Example 1 and 2. Is added 1.5 mL of the polymer resin to a slide of AISI 1010 carbon steel of 50×24 mm, immediately weighed for a period of 24 h. FIG. 5 shows the sequence of drying of these polymer resins, which in the case of FIG. 5A is a copolymer with a high concentration of methyl methacrylate, which causes the particle to be slightly deformable (hard particle). Because this film does not form inter-diffused or homogeneous. In the case of FIG. 5B, the polymer resin is composed of three monomers with a ratio such that they generate a system with particles that are capable of inter-diffuse (partially smooth particle). This property creates a film with a lower amount of imperfections, being a more homogeneous system. FIG. 5 shows the determination of the drying rate with respect to particle size of waterborne polymeric coatings on metal and glass substrate (plate of AISI 1010 carbon steel), which is performed to test the efficiency of the coatings. FIG. 5A corresponds to the polymer resin of Example 1. FIG. 5B corresponds to the polymer resin of Example 2 (polymer resin three monomers).

Figure 6:
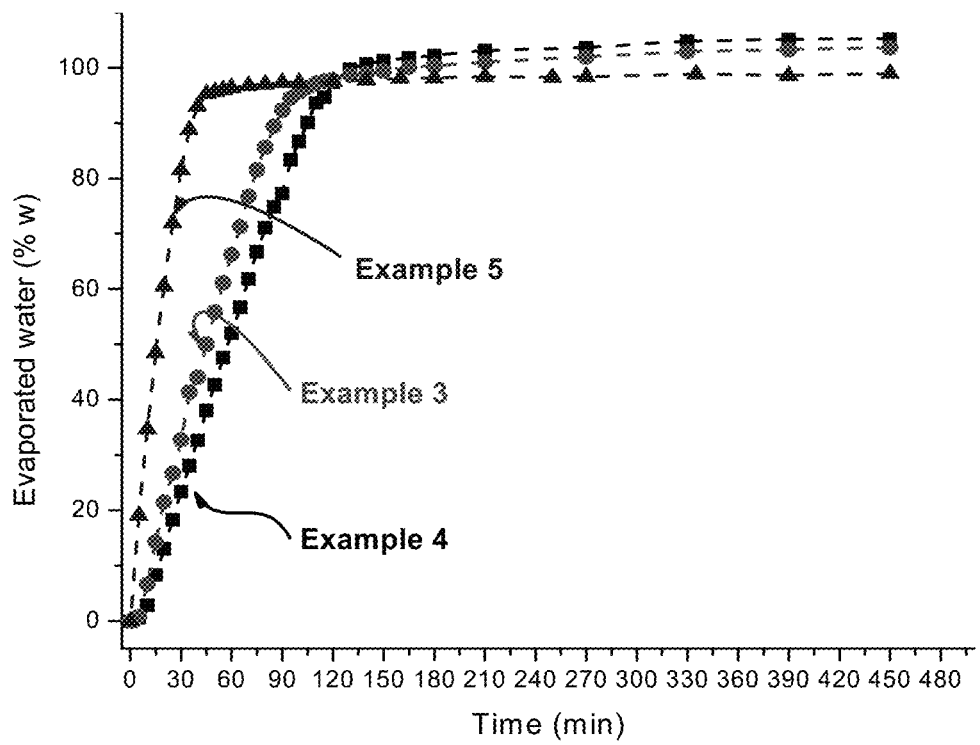

FIG. 6 describes the path of the drying curves with respect to time of the polymeric resin 100% To evaluate the speed of drying on a glass slide of 50×24 mm, spread products of Examples 3 and 4, immediately were weighed for a period of 24 h. FIG. 6 describes the path of the drying curves with respect to time of the 100% polymer resin, water-based polymeric resin doped nanotubes and commercial epoxy polymer resin.

As can be seen, the drying speed is essential for complete removal of solvent. Example 4 shows a lower drying speed than those of the other two polymeric resins. However, are 100% water based coatings, especially doped nanotubes alone in achieving measurement in the range of 100% dry. Example 3 has the same behavior even when its initial drying speed is slightly higher than in Example 4. In Example 5, which is based on a solvent-based resin is shown logically an initial speed of solvent evaporation much higher than that of Examples 3 and 4, but since the surface layer of the coating occurs first inter-diffusion of the polymer chains prevents the solvent evaporates completely, so that it reaches an efficiency of around 96%, resulting in that the coating is not able to achieve total drying, unlike the two resins 100% water based polymer derived from this invention.

Finally it can be concluded that rapid drying of the polymer film has a direct dependency on particle size, whereas there is an optimum size for the arrangement of the particles and the drying rate. If the particle size is too small can increase the rate of inter-diffusion of particles, which will be at a higher concentration of solvent trapped between polymer particles. Manner contrary if the particle size is too large, voids may be formed not to allow the inter-diffusion of particles and create defects in the final coating.

Example 8. Evaluation of Water-Based Coating Adhesion

Figure 7:
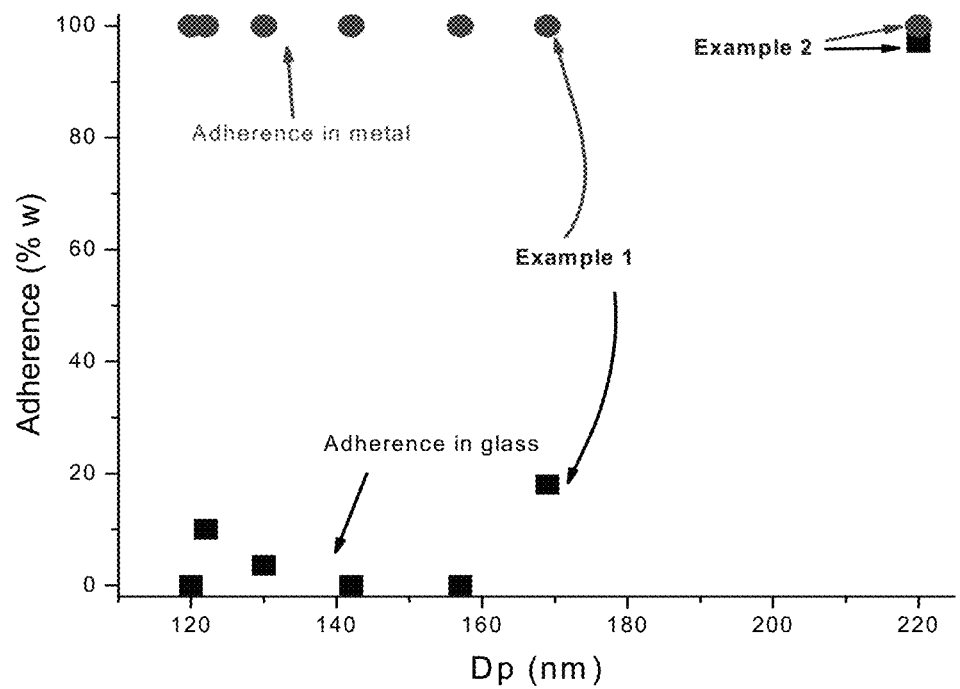

With respect to FIG. 7 illustrates the graphical representation of the adhesion with respect to particle size of Example 1 (copolymer resin formed from two monomers, 100% water based) and Example 2 (terpolimérica resin formed from three monomers, 100% water based). Measurements were performed on a particle size Autosizer Malvern 4800 spectrometer with a laser Coherent Innova 90c, which we can see that in the metal substrate high performance is obtained with respect to the adhesion of the coatings, this may be due to the presence of a functionalizing agent, which generates electrostatic interactions with the metal substrate. The metal substrate used was AISI 1010 carbon steel, the lower carbon content and manganese, proving to be the more corrosion showing a very short period of time, so that the reference with which it may have the boundary maximum corrosion.

Similarly, we could observe that on the glass substrate is totally different performance, although there is a particle size range in which the coating is more efficient. Of course, there is a better performance in the coating of Example 4 in regard to adherence to the two substrates.

It is noteworthy that the sample is not in this three graphical representation because it was not possible to obtain the particle size by the same method, so it was considered unrepresentative. However, the images show evidence of membership of the three examples were performed according to ASTM D 3359-02.

Figure 8:
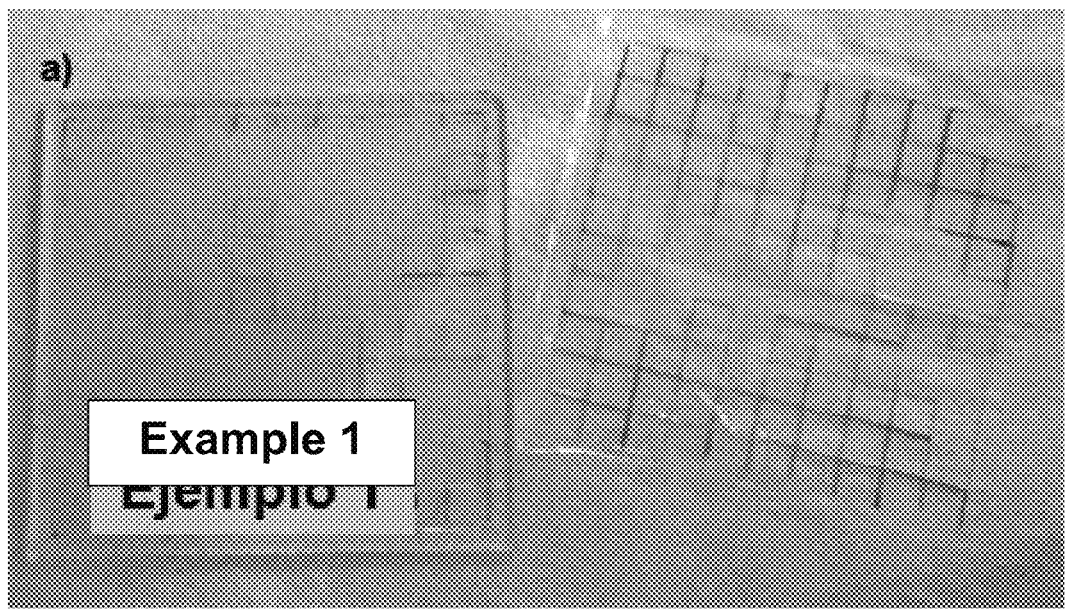
Figure 9:
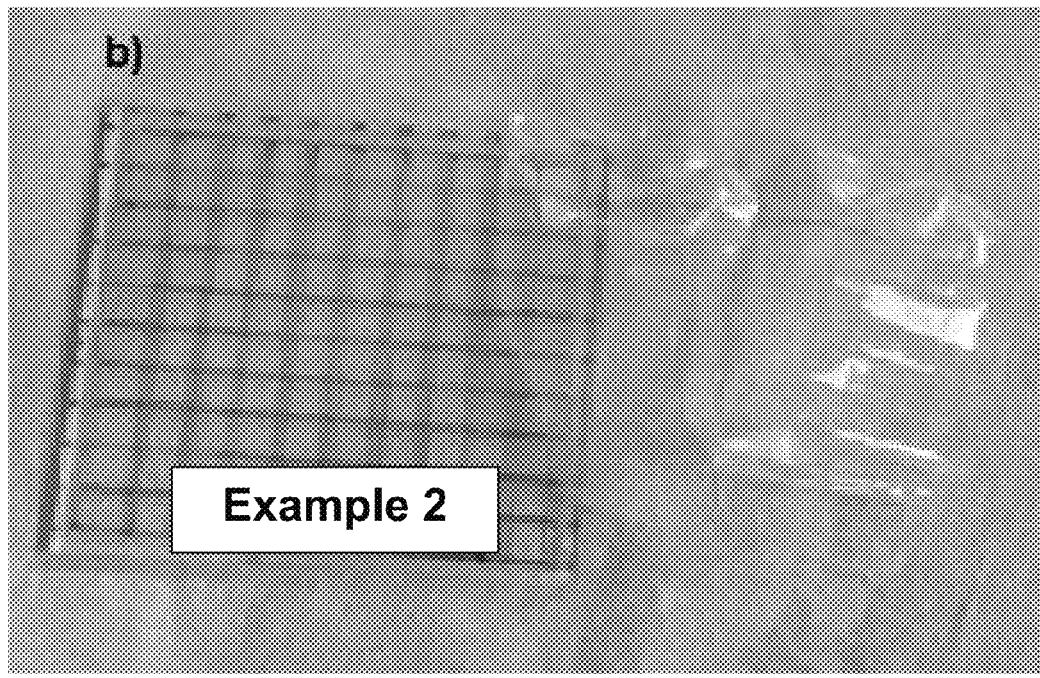
FIG. 9 illustrates images adhesion evaluation of Example 2 (the three monomers polymeric resin 100% water based).
Figure 10:
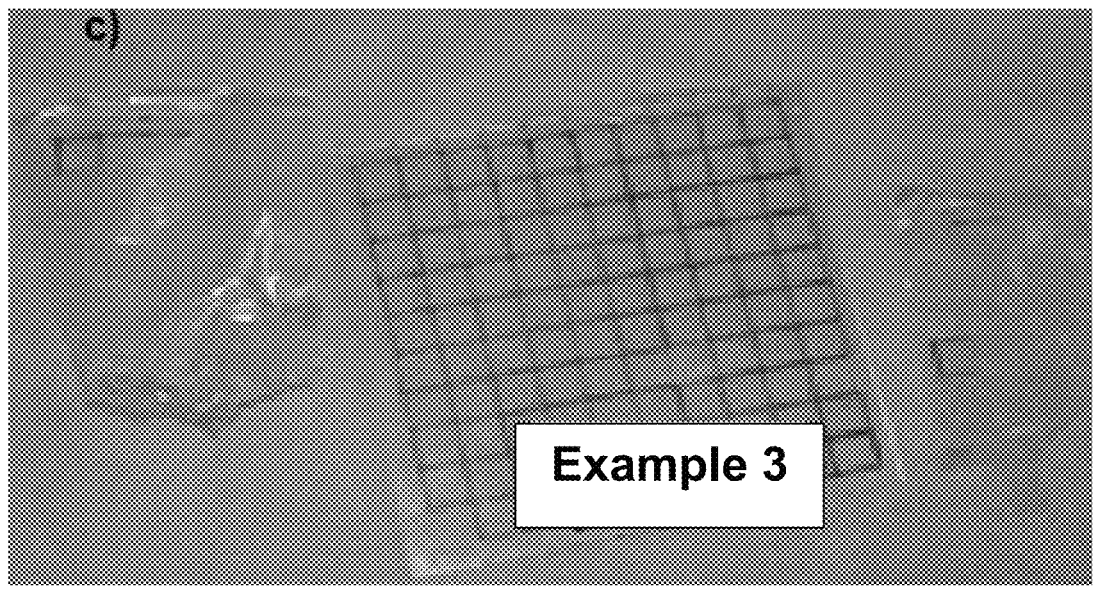
FIG. 10 shows images of the adhesion evaluation of Example 3 (commercial epoxy coating).

FIGS. 8, 9 and 10 display images on the adhesion evaluation of Example 1 (copolymer resin formed by using two monomers, based 100% water) Example 2 (Resin terpolimerica synthesized using three monomers, 100% water based) and example 3 (commercial epoxy coating), respectively, that verifies the improvement in performance of polymer resins based 100% water (relative to the commercial resin) due to the effects of particle size control and the addition of an agent functionalizing, under more efficient when applied nanotubes, matching and exceeding the commercial coating performance in regards to increased adhesion to the substrate and better mechanical resistance to rupture.

What is claimed is:

1. A water-based anticorrosive composition comprising a polymer dispersion, titanium dioxide nanotubes and water, wherein said composition is obtained by a method of:
    a) in the case of monomer addition in a single step, feeding from an addition tank using a metering pump at a constant rate between 2 and 4 g/min·L to a main reactor, a selected combination of monomers together with water, initiator, surfactant, crosslinking agent and functionalizing agent as an adhesion promoter in a semi-continuous array by direct addition,
    b) a reaction to produce seed formation, under the following operating conditions:
    temperature between 60 and 90° C., stirring speed of 180 rpm and up to 1% by weight of the total monomers, where a total amount of said monomers, initiator and surfactants are within the range of 5 to 20% by weight based on the total amount of water,
    c) adding a pre-emulsion consisting of a combination of monomers together with water, initiator, surfactant and crosslinking agent, wherein said monomers comprise mixtures of two, three or four styrenic monomers, vinyl monomers and/or acrylic monomers in the an aqueous phase at a constant rate of less than 2 and 4 g/min·L into the main reactor using the metering pump,
    d) in the case of a two-step addition, once the first addition step (a) is introduced into the reactor at the controlled rate of less than 3 g/min·L combining monomers together with water, initiator, surfactant, a mixture of two, three or four styrenic monomers, vinyl monomers and/or acrylic monomers and the functionalizing agent, which acts as an adhesion promoter to the a substrate, e) once the addition of the monomers, either in one or two stages, eliminating the residual monomer by heating, and f) adding titanium dioxide nanotubes in the case of a one-step process together with the mixture of monomers, and in the case of the two-step process to obtain core-shell particles, a dispersion of the nanotubes is added to the first step (a) or second step (b) together with the pre-emulsion.

2. The composition of claim 1, wherein the pre-emulsion in step c includes a preliminary preparation of a seed for controlling the number of particles obtained in step (b).

3. The composition of claim 1, wherein the seed in step (b) is formed from 0.5 to 10% by weight of the total monomers in step (b).

4. The composition of claim 1, wherein the total amount of initiator is between 0.5 and 10% by weight relative to the total monomer content.

5. The composition of claim 1, wherein the initiator in step (a) and step (c) is selected from the group consisting of hydrogen peroxide, tert-butyl hydroperoxide, peroxide diterbutilo, hydroxyperoxide, ammonium persulfate, potassium persulfate and sodium perphosphate azobisisobutyronitrile.

6. The composition of claim 1, wherein the surfactants in step (a) and step (c) used are added from 0.5 to 10% by weight with respect to the concentration of the monomers.

7. The composition of claim 1, wherein the surfactants in step (a) and step (c) are selected from the group consisting of sodium lauryl sulfate, aryl sulfonates, isopropyl benzyl sulfate, octyl sulfosuccinate and sodium alkylaryl polyglycol ether sulfate.

8. The composition of claim 1, wherein polymer particles are obtained from step (c) or step (d) have a size in a range from 30 to 600 nm.

9. The composition of claim 1, wherein polymer particles are obtained in step (d), wherein the polymer particles are core-shell particles having a spherical core in a ratio of 10 to 90% of the total weight of the particles and a shell that covers the 90 to 10% of the total weight of the particles.

10. The composition of claim 1, further comprising adding pH buffers selected from the group consisting of ammonium bicarbonate, potassium bicarbonate, calcium carbonate, calcium bicarbonate, di hydrogen phosphate, and latex.

11. The composition of claim 1, wherein at least one monomer is from the group consisting of methyl acrylate, ethyl acrylate, methyl methacrylate, methacrylate ethyl acrylate, isopropyl acrylate, butyl acrylate, butyl methacrylate, 2-ethylhexyl acrylate, neopentyl methacrylate, neopentyl acrylate, decyl acrylate, lauryl methacrylate, benzyl acrylate, phenyl ester, butyl ester and pentyl ester.

12. The composition of claim 1, wherein the styrenic monomer of step (c) and step (d) is selected from the group consisting of styrene, vinyl toluene and alpha methyl styrene.

13. The composition of claim 1, wherein the vinyl monomer of step (c) or step (d) is vinyl acetate.

14. The composition of claim 1, wherein the functionalizing agent is selected from the group consisting of acrylic acid, methacrylic acid, chloroacrylic acid, cyanoacrylic acid, propionic acid and itaconic acid, in an amount of 20% by weight or less of total monomers.

15. The composition of claim 1, wherein the crosslinking agent is selected from the group consisting of divinylbenzene, ethylene glycol dimethyl acrylate, trimethyl propane trimethacrylate, and di(trimethylolpropane) tetraacrylate and pentaerythritol tetraacrylate, at a concentration of 15% by weight or less.

16. The composition of claim 1, wherein a polymer dispersion comprising copolymers, terpolymers or tetrapolymers is obtained from acrylic monomers from steps (c) or (d), wherein the acrylic monomers have 1 to 8 carbon atoms.

17. The composition of claim 1, wherein a polymer dispersion comprising copolymers, terpolymers or tetrapolymers is obtained from at least one styrene monomer and/or a vinyl monomer, and acrylate monomers in step (c) or step (d) in an amount of 80% by weight or less based on the total weight of the monomers.

18. The composition of claim 1, wherein a polymer dispersion comprising copolymers, terpolymers or tetrapolymers is obtained from styrenic monomers and at least one acrylic monomer and/or a vinyl monomer in step (c) or (d) in an amount of 70% by weight or less based on the total weight of the monomers.

19. The composition of claim 1, wherein a polymer dispersion comprising copolymers, terpolymers or tetrapolymers is obtained from a vinyl monomer and at least an acrylic monomer and/or styrene monomer in steps (c) or (d) in an amount of 50% by weight or less based on the total weight of the monomers.

20. The composition of claim 1, wherein a polymer dispersion comprising a copolymer, terpolymer or tetrapolymer functionalized and/or crosslinked polymeric resin is obtained from step (c) or (d) in an amount of 10 to 60% by weight based on the total weight of an aqueous medium.

21. The composition of claim 1, wherein said composition comprises 10 to 60% by weight of a polymer dispersion obtained from step (c) or (d), 0.005 to 1 wt % of nanotubes of titanium dioxide and the balance of an aqueous medium to 100%.

22. The composition of claim 21, wherein the polymer dispersion is composed of copolymers, terpolymers or tetrapolymers functionalized and/or crosslinked and doped with titanium dioxide nanotubes having a particle size range between 30 to 600 nm, wherein the concentration of said nanotube ranges from 50 to 10,000 ppm.

23. A method of inhibiting corrosion of metal surfaces selected from the group consisting of stainless steel, carbon steel and copper, said method comprising the step of coating said metal surface with the composition of claim 21.

* * * * *